(12) United States Patent
Rickis et al.

(10) Patent No.: US 9,175,789 B2
(45) Date of Patent: Nov. 3, 2015

(54) PRESSURE REGULATING VALVE

(71) Applicant: Hamilton Sundstrand Corporation, Windsor Locks, CT (US)

(72) Inventors: Aaron Rickis, Feeding Hills, MA (US); David J. Podgorski, Suffield, CT (US)

(73) Assignee: Hamilton Sundstrand Corporation, Windsor Lociks, CT (US)

( * ) Notice: Subject to any disclaimer, the term of this patent is extended or adjusted under 35 U.S.C. 154(b) by 214 days.

(21) Appl. No.: 13/657,927

(22) Filed: Oct. 23, 2012

(65) Prior Publication Data

US 2014/0109979 A1  Apr. 24, 2014

(51) Int. Cl.
| | |
|---|---|
| *F16K 31/12* | (2006.01) |
| *F16K 51/00* | (2006.01) |
| *F16K 11/07* | (2006.01) |
| *G05D 16/10* | (2006.01) |

(52) U.S. Cl.
CPC ............... *F16K 51/00* (2013.01); *F16K 11/07* (2013.01); *G05D 16/10* (2013.01); *Y10T 137/0441* (2015.04); *Y10T 137/6851* (2015.04); *Y10T 137/7793* (2015.04); *Y10T 137/85978* (2015.04)

(58) Field of Classification Search
CPC ........... F16K 1/00; F16K 11/07; G05D 16/10; Y10T 137/0441; Y10T 137/85978; Y10T 137/6851; Y10T 137/7793
USPC ............... 137/625.3, 625.37, 625.69, 625.67, 137/625.66, 625.2, 565.01, 505.14, 486; 251/206; 60/241, 243
See application file for complete search history.

(56) References Cited

U.S. PATENT DOCUMENTS

| | | | | |
|---|---|---|---|---|
| 2,520,434 | A | * | 8/1950 | Devereux ........................ 60/764 |
| 4,109,683 | A | * | 8/1978 | Strache ...................... 137/625.3 |
| 4,424,666 | A | | 1/1984 | Woody |
| 4,876,857 | A | | 10/1989 | Feltz et al. |
| 5,448,882 | A | | 9/1995 | Dyer et al. |
| 5,845,484 | A | | 12/1998 | Maker |
| 5,896,737 | A | | 4/1999 | Dyer |
| 6,289,919 | B1 | | 9/2001 | Sledd et al. |
| 6,321,527 | B1 | | 11/2001 | Dyer et al. |
| 6,401,446 | B1 | * | 6/2002 | Gibbons ..................... 60/39.281 |
| 6,651,441 | B2 | | 11/2003 | Reuter et al. |
| 6,666,015 | B2 | | 12/2003 | Dyer |
| 7,413,141 | B1 | | 8/2008 | Smith |
| 2008/0296403 | A1 | * | 12/2008 | Futa et al. ........................ 239/95 |
| 2010/0229983 | A1 | * | 9/2010 | Tackes et al. ............. 137/625.35 |
| 2010/0283333 | A1 | * | 11/2010 | Lemmers et al. ................ 310/54 |
| 2010/0313980 | A1 | * | 12/2010 | Shimizu et al. ........... 137/625.64 |

* cited by examiner

*Primary Examiner* — Jessica Cahill

(74) *Attorney, Agent, or Firm* — Carlson, Gaskey & Olds, PC

(57) ABSTRACT

In one featured embodiment, a sleeve for a valve includes a sleeve body surrounding a center axis and defined by an overall length extending from a first end to a second end. The sleeve body has a central bore extending from the first end to the second end. The central bore has a first surface portion comprising a piston contact surface that is defined by a first inner diameter, wherein the piston contact surface is configured to slide against a piston to be received within the central bore. In one example, a ratio of the overall length to the first inner diameter is between 3.51 and 3.63.

31 Claims, 6 Drawing Sheets

PRESSURE REGULATING VALVE

BACKGROUND OF THE INVENTION

This application relates to a pressure regulating valve which may be utilized in a fuel line for an aircraft engine.

A gas turbine engine is typically used to power an aircraft. A fuel system provides fuel to various portions of the gas turbine engine. Fuel is primarily delivered into a combustor section of the gas turbine engine. Airflow through the gas turbine engine is compressed by one or more compressors, mixed and burned with fuel in the combustor, and then expanded over one or more turbines. The fuel is supplied to the gas turbine engine by a fuel pump from a fuel supply, and passes through a filter on the way to the engine. The fuel system also includes various valves, such as a pressure regulating valve, high pressure relief valve, filter bypass valve, etc., which cooperate with each other to supply fuel to the gas turbine engine in a controlled and accurate manner.

The metering valve supplies a specified amount of fuel to the engine for various operating conditions. The pressure regulating valve sets a predetermined pressure differential across the metering valve. This allows control over flow to the engine based on metering valve position. Under certain conditions, not all of the fuel being supplied by the pump is needed by the engine. The pressure regulating valve also returns excess fuel back to the fuel pump. Existing pressure regulating valves may sometimes result in undesirable pressure setting shifts at different operating conditions.

SUMMARY OF THE INVENTION

In one exemplary embodiment, a sleeve for a valve includes a sleeve body surrounding a center axis and defined by an overall length extending from a first end to a second end. The sleeve body has a central bore extending from the first end to the second end. The central bore has a first surface portion comprising a piston contact surface that is defined by a first inner diameter, wherein the piston contact surface is configured to slide against a piston to be received within the central bore. In one example, a ratio of the overall length to the first inner diameter is between 3.51 and 3.63.

In a further embodiment of the above, the sleeve body includes at least a first set of windows extending circumferentially about the center axis, wherein the central bore has a second surface portion at the first set of windows that is defined by a second inner diameter greater than the first inner diameter.

In a further embodiment of any of the above, a ratio of the first inner diameter to the second inner diameter is between 0.77 and 0.82.

In another exemplary embodiment, a piston for a valve includes a piston body surrounding a center axis and defined by an overall length extending from a first end to a second end. The piston body has an outer surface comprising a sleeve contact surface that is defined by an outer diameter. In one example, a ratio of the overall length to the outer diameter is between 3.58 and 3.71.

In a further embodiment of any of the above, the piston body includes a plurality of recessed areas that are spaced circumferentially apart from each other about center axis. Each recessed area is defined by a recess length and a recess width, and wherein a ratio of the recess length to the recess width is between 2.28 and 2.52.

In another exemplary embodiment, a pressure regulating valve includes a valve housing defining an internal bore and having a valve inlet to receive fluid at a first pressure and a fluid outlet to return fluid to a pump. A sleeve surrounds a center axis and is defined by an overall sleeve length extending from a first sleeve end to a second sleeve end. The sleeve has a central sleeve bore extending from the first sleeve end to the second sleeve end. A piston is received within the central sleeve bore and is defined by an overall piston length extending from a first piston end to a second piston end. The piston has an outer surface comprising a sleeve contact surface that is defined by an outer diameter. The central sleeve bore has a first surface portion comprising a piston contact surface that is defined by a first inner diameter, and wherein the piston contact surface is configured to slide against the sleeve contact surface. A spring assembly biases the piston within the sleeve to a valve closed position, and wherein when the first pressure at the valve inlet is greater than a spring biasing load, the piston moves to a valve open position to return fluid to the pump via the valve outlet. In one example, a ratio of the first inner diameter of the sleeve to the outer diameter of the piston is between 0.99 and 1.01.

In a further embodiment of any of the above, a ratio of the overall sleeve length to the overall piston length is between 0.96 and 1.00.

These and other features may be best understood from the following drawings and specification.

DETAILED DESCRIPTION

Figure 1:
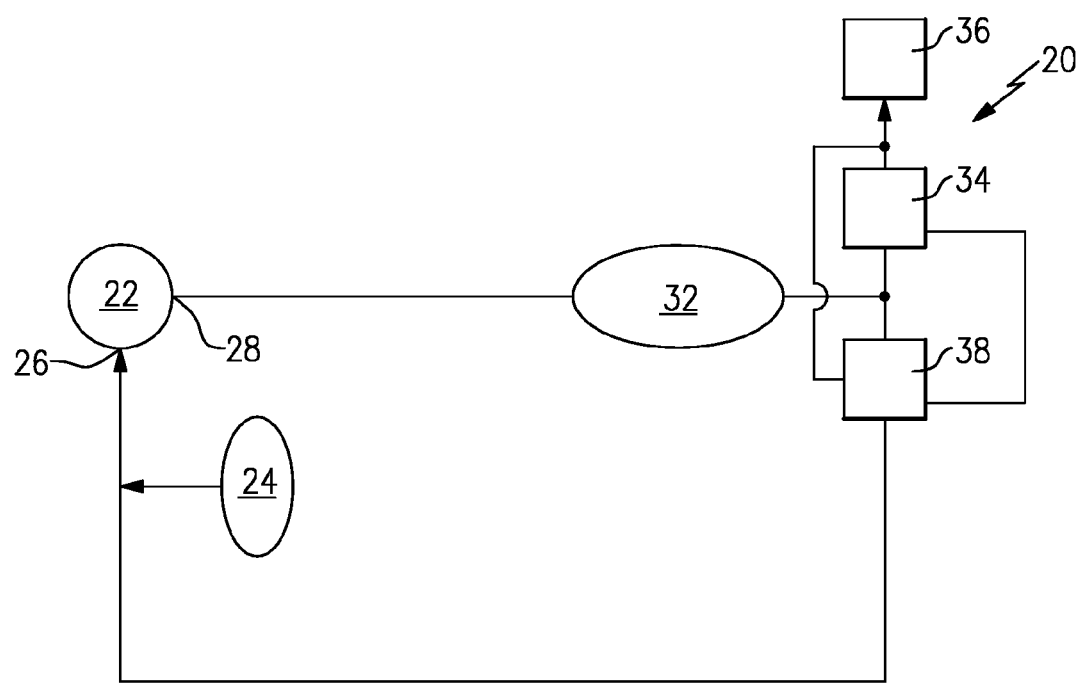
FIG. 1 shows a schematic view of a fuel system for an aircraft.

FIG. 1 shows a schematic view of an aircraft fuel supply system 20 having a fuel pump 22 drawing fuel from a fuel supply 24. The pump 22 has a pump inlet 26 in fluid communication with the fuel supply 24 and a pump outlet 28 in fluid communication with a metering valve 34 and a pressure regulating valve 38. Fuel passes through a filter 32 to remove contaminants. Fuel exiting the filter 32 is then directed to the metering valve 34 to supply fuel to an engine 36. The pressure regulating valve 38 receives pressure inputs from sense lines around the metering valve 34 to regulate the pressure across the metering valve 34. If the supply of fuel at the metering valve 34 is excessive for the current engine operating condition, the pressure regulating valve 38 returns the excess fuel to the pump inlet 26.

Figure 2:
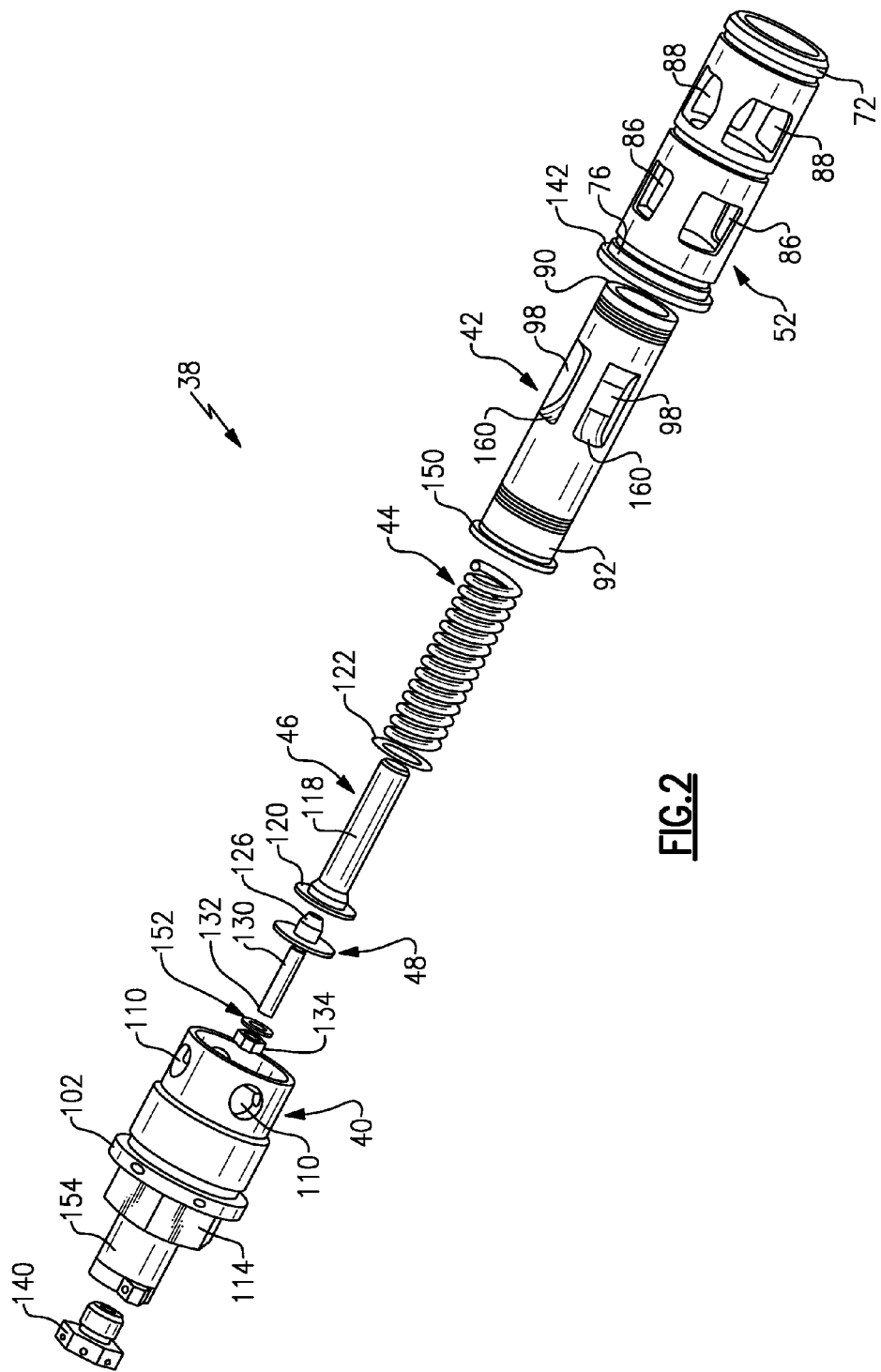
FIG. 2 is an exploded view of a pressure regulating valve of FIG. 1.
Figure 3:
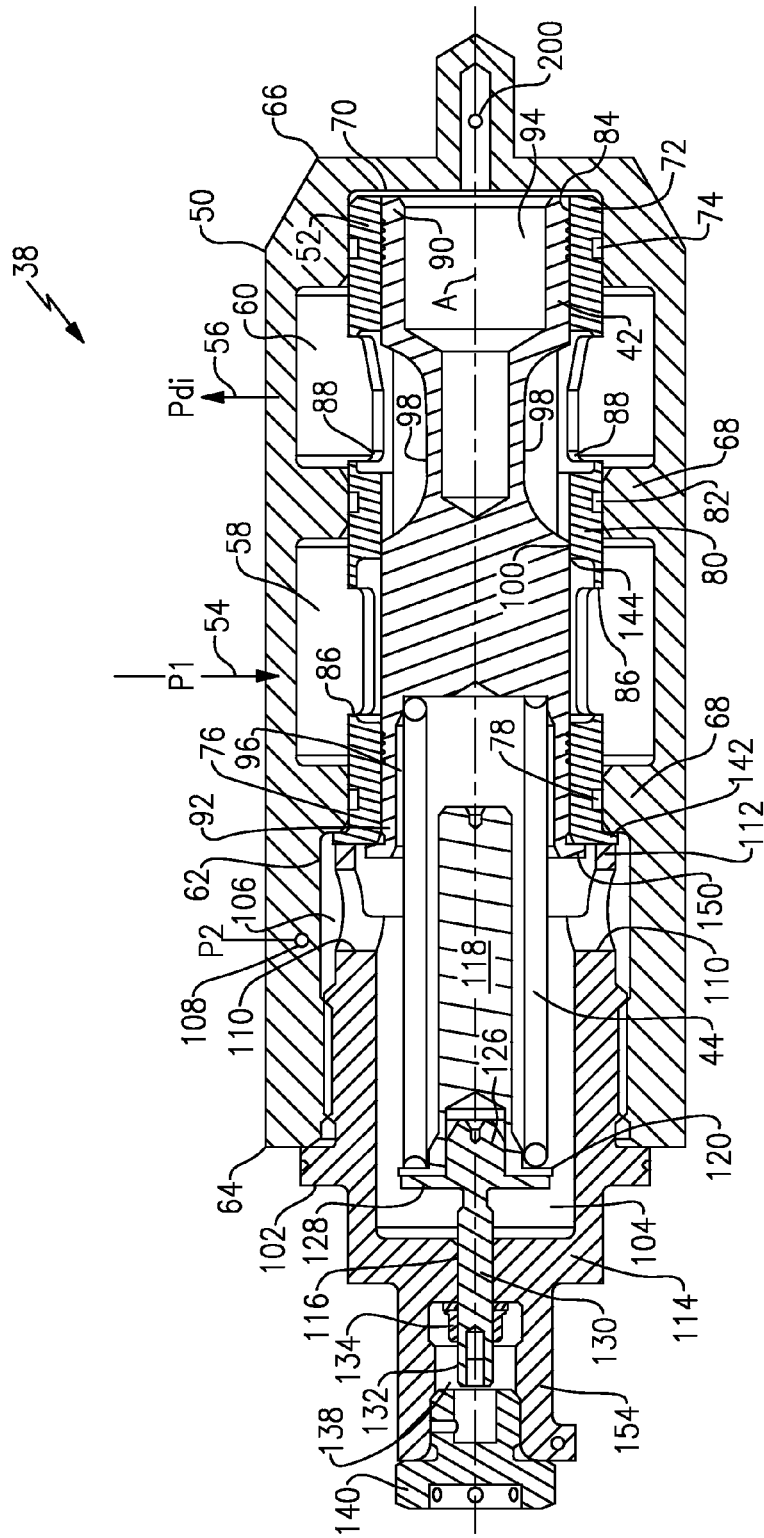
FIG. 3 is a section view of the pressure regulating valve in a valve closed position.
Figure 4:
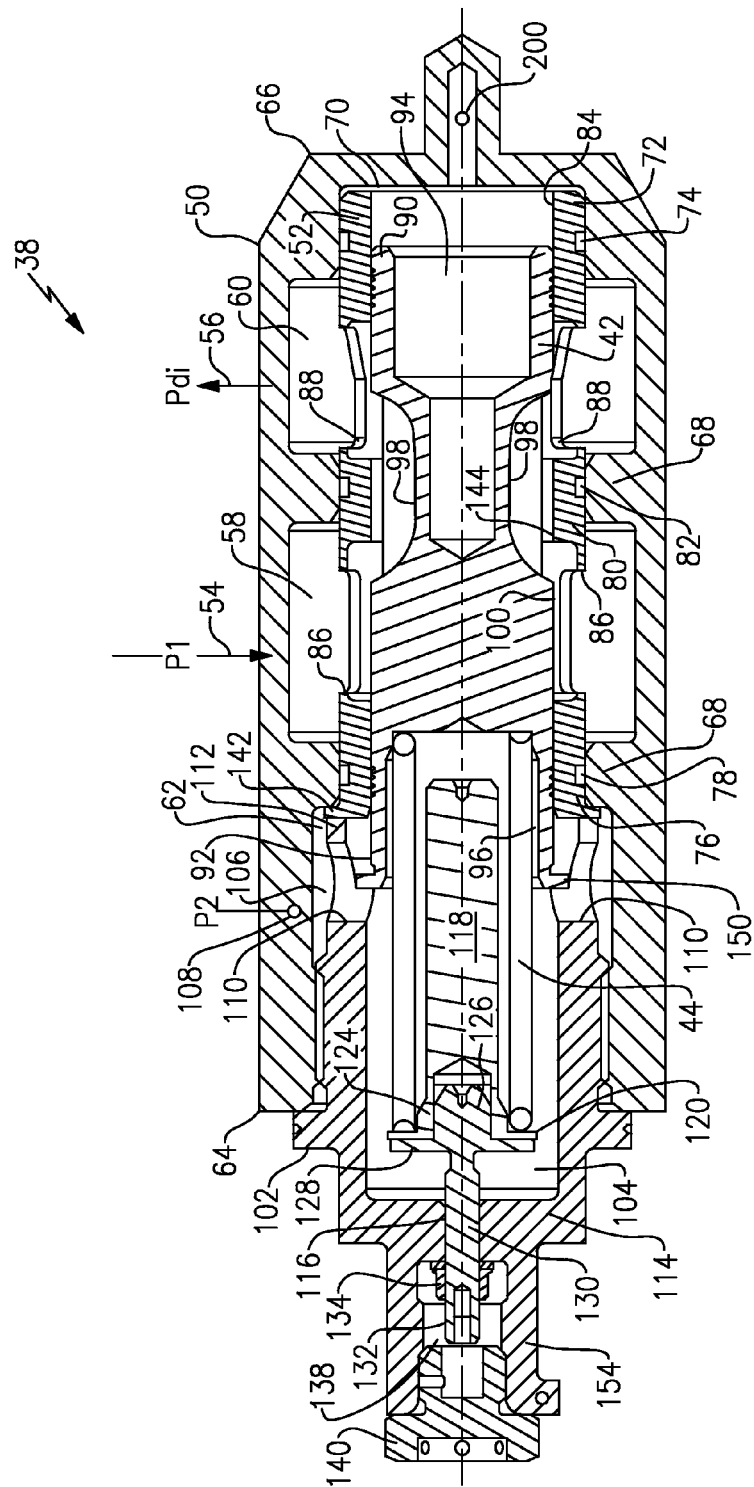
FIG. 4 is a section view of the pressure regulating valve in a valve open position.

The pressure regulating valve 38 is shown in greater detail in FIGS. 2-4. The primary components of the pressure regulating valve 38 include a closure 40, piston 42, spring 44, spacer 46, adjusting screw 48, a valve housing 50 (FIG. 3), and a sleeve 52. The valve housing 50 includes a pressure inlet 54 that is in fluid communication with the metering valve 34 and is at a first pressure P1. The valve housing 50 also includes a pressure outlet 56 that returns excess fuel to the pump 22 at a return pressure Pdi. The valve housing 50 defines a valve center axis A and has an internal cavity that provides at least three main chambers. A first chamber 58 receives fuel from the pressure inlet 54, a second chamber 60 is provided at the pressure outlet 56, and a third chamber 62 receives the closure 40 and adjusting screw 48. In the example shown, the first chamber 58 is positioned axially between the second 60 and third 62 chambers.

The valve housing 50 extends from an open first end 64 to an enclosed second end 66. The sleeve 52 is inserted through the open first end 64 and is held fixed within the valve housing 50 by inwardly, or radially, extending seat portions 68. The seat portions 68 cooperate with the sleeve 52 to define the chambers. The sleeve 52 is positioned substantially within the first 58 and second 60 chambers. The enclosed second end 66 of the valve housing 50 includes a recess 70 that receives a first end 72 of the sleeve 52 in a press-fit. A seal 74 is provided between an outer surface of the sleeve 52 and an inner surface of the recess 70.

An outer surface of the second end 76 of the sleeve 52 is sealed against one seat portion 68 with a seal 78. An outer surface of a center portion 80 of the sleeve 52 is sealed against another seat portion 68 with a seal 82. The sleeve 52 comprises a cylindrical body that is open at each sleeve end 72, 76 to define a central sleeve bore 84.

The sleeve 52 includes a first set of windows 86 that are positioned within the first chamber 58 and a second set of windows 88 that are positioned within the second chamber 60. The first set of windows 86 is in fluid communication with the pressure inlet 54 and the second set of windows 88 is in fluid communication with the pressure outlet 56.

The spool or piston 42 slides within the sleeve bore 84. The piston 42 extends from a first end 90 to a second end 92. An outer surface of the first end 90 abuts against an inner surface of sleeve 52 and also slides along the inner surface of the sleeve 52 at the first sleeve end 72. An outer surface of the second end 92 slides along an inner surface of the sleeve 52 and also abuts the sleeve 52 at the second sleeve end 76. The piston 42 includes a piston chamber 94 at the first end 90 that is at a fluid pressure P1 corresponding to the fluid pressure at the pressure inlet 54. The piston 42 includes a spring chamber 96 at the second end 92 that receives one end of the spring 44.

The piston 42 includes a plurality of recessed areas 98, referred to as "buckets," which are formed about an outer circumference of the piston 42. Enclosed bottom surfaces of the recessed areas 98 are radially inward of a piston outer surface 100 that contacts the sleeve 52. The recessed areas 98 at least partially overlap the center portion 80 of the sleeve 52 when the piston 42 is fit within the sleeve 52. When the pressure regulating valve 38 is in the closed position (FIG. 3), the center portion 80 of the sleeve 52 and an outer surface 100 of the piston 42 cooperate to prevent fluid flow from the pressure inlet 54 to the pressure outlet 56. In this position, the recessed areas 98 are not fluidly connected to the first set of windows 86 in the sleeve 52. When the pressure regulating valve 38 is in the open position (FIG. 4), the piston 42 has moved along the axis A such that the recessed areas 98 fluidly connect the first set of windows 86 to the second set of windows 88, and thus fluidly connects the pressure inlet 54 to the pressure outlet 56.

The closure 40 is positioned within the third chamber 62 of the valve housing 50 and includes a flange portion 102 that is seated against an end face of the valve housing 50 to close off the open end of the valve housing 50. The closure 40 defines an internal cavity 104 that receives the spacer 46, adjusting screw 48, and spring 44.

An annulus 106 is formed between an outer surface of the closure 40 and an inner surface of the valve housing 50. A separate pressure inlet 108 supplies pressure to the annulus 106 at a second pressure P2. The closure 40 includes a plurality of ports 110 that are formed about an outer circumference of a first end 112 of the closure 40. The ports 110 fluidly connect the annulus 106 with the internal cavity 104 of the closure 40.

The spacer 46 includes an elongated body portion 118 with a spring seat flange 120 at one end. The elongated body portion 118 is received within the spring 44 such that one end of the spring 44 abuts against the spring seat flange 120. An optional washer 122 (FIG. 2) can be positioned between the spring end and the spring seat flange 120. An opening 124 is formed within an end face of the spacer 46 at the spring seat flange 120.

The adjusting screw 48 includes an end 126 that is inserted into the opening 124 of the spacer 46. The adjusting screw 48 includes a flange 128 that is seated against the spring seat flange 120 when the end 126 is received within the opening 124. The adjusting screw 48 has an elongated body 130 that extends from the flange 128 to a threaded end 132 that receives a nut 134. A washer 152 is utilized with the nut 134 to prevent axial movement during operation.

The closure 40 includes end face portion 114 with a center bore 116. The elongated body 130 of the adjusting screw 48 extends through the bore 116 into an outer cavity 138 formed within a closure extension portion 154 that extends outwardly from the end face portion 114. The nut 134 is tightened against the end face portion 114 within the outer cavity 138 to adjust the spring force of the spring 44. A plug 140 is inserted into the closure extension portion 154 to seal the outer cavity 138.

The spring force and the fluid pressure from the separate pressure inlet 108 cooperate to bias the piston 42 to the closed position. When the pressure at the pressure inlet 200 overcomes the combination of the spring force and pressure from pressure inlet 108, the piston moves the valve 38 to the open position to fluidly connect the pressure inlet 54 to the outlet 56.

Figure 5:
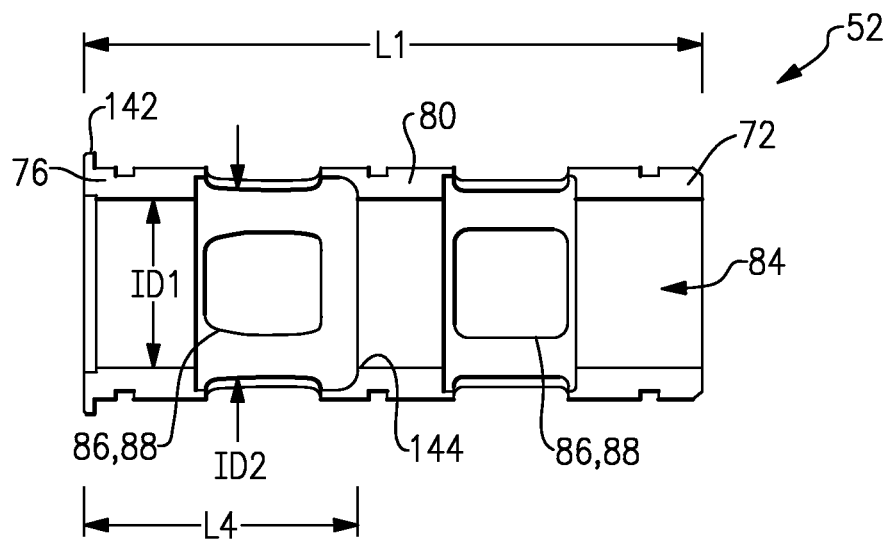
FIG. 5 is a section view of a sleeve of the pressure regulating valve of FIG. 2.

The sleeve 52 is shown in greater detail in FIG. 5. The sleeve 52 is defined by an overall length L1 and has an inner diameter ID1 (sleeve match diameter) that defines a surface that abuts against the piston 42. The sleeve 52 also includes an increased inner diameter section at the windows 86, 88. This section is defined by a window inner diameter ID2 that is greater than the match inner diameter ID1.

In one example, the first set of windows 86 is defined by a first shape and the second set of windows 88 is defined by a second shape that is different than the first shape. In one example, one of the first or second shapes comprises a substantially square shape and the other of the first or second shape comprises a substantially square shape with an inwardly tapering end.

Figure 6:
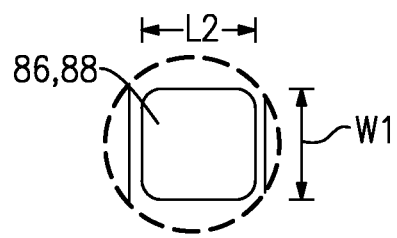
FIG. 6 is a detail view of a window from one of first and second sets of windows in the sleeve.
Figure 7:
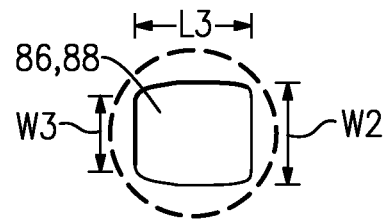
FIG. 7 is a detail view of a window from the other of the first and second sets of windows in the sleeve.

In one example shown in FIGS. 6-7, the first windows 86 are defined by a width W1, which extends in the circumferential direction, and the second windows are defined by a width W2. The first windows 86 are defined by a length L2 and the second windows 88 are defined by a length L3. For the set of windows 86 or 88 that includes the square shape with a tapered end, the windows are defined by the width W1 or W2 at the non-tapered window end, and are defined by a narrower width W3 (FIG. 7) at the tapered window end.

In one example, the window width W1, W2 is 0.620 inches (1.575 cm) and the window width W3 is 0.362 inches (0.919 cm). A ratio of the window width W1, W2 to the window width W3 is between 0.97 and 5.76.

The sleeve 52 includes a flange 142 at one end that abuts against the seat portions 68 when the sleeve is fit within the valve housing 50. In one example, the sleeve 52 defines a length L4 from the sleeve end with the flange 142 to a step 144 formed at the end of the first set of windows 86.

Figure 8:
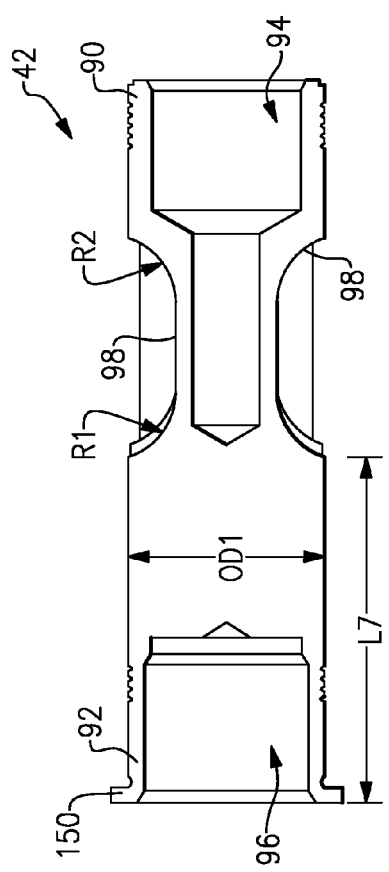
FIG. 8 is a section view of a piston from the pressure regulating valve of FIG. 2.
Figure 9:
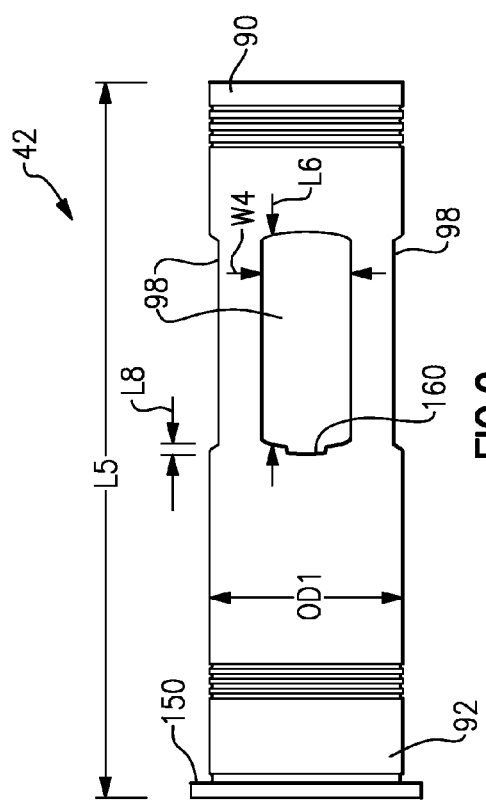
FIG. 9 is a top view of the piston of FIG. 8.

The piston 42 is shown in greater detail in FIGS. 8-9. The piston 42 is defined by an overall length L5 and has an outer diameter OD1 (piston match diameter) that defines a surface that abuts against the sleeve match diameter ID1 of the sleeve 52. The recessed areas 98 are defined by a length L6 and a width W4.

The piston 42 includes a flange 150 at one end that abuts against an end of the sleeve 52. The piston 42 defines a length L7 that extends from the end with the flange 150 to the first edge of the recessed area 98.

One edge of the recessed area is defined by a first radius R1 and the opposite edge of the recessed area 98 is defined by a second radius. In one example, the first radius R1 is within a range of between 0.275 (0.699 cm) and 0.4 inches (1.016 cm) and the second radius is within a range between 0.275 (0.699 cm) and 0.4 (1.016 cm) inches.

In one example, the overall length L1 of the sleeve 52 is 3.576 inches (9.083 cm) and the sleeve match diameter ID1 is 1.003 inches (2.548 cm). A ratio of the overall length L1 of the sleeve 52 to the sleeve match diameter ID1 is between 3.51 and 3.63.

In one example, the sleeve match diameter ID1 is 1.003 inches (2.548 cm) and the inner diameter ID2 at the windows 86, 88 is 1.260 inches (3.200 cm). A ratio of the sleeve match diameter ID1 to the inner diameter ID2 at the windows 86, 88 is between 0.77 and 0.82.

In one example, a window width W1, W2 is 0.620 inches (1.575 cm) and the inner diameter ID2 at the windows 86, 88 is 1.260 inches (3.200 cm). A ratio of the window width W1, W2 to the inner diameter ID2 at the windows 86, 88 is between 0.46 and 0.53.

In one example, the overall length L1 of the sleeve 52 is 3.576 inches (9.083 cm) and the window width W1, W2 is 0.620 inches (1.575 cm). A ratio of the overall length L1 of the sleeve 52 to the window width W1, W2 is between 5.50 and 6.06.

In one example, the length L4 from the sleeve end with the flange 142 to a step 144 formed at the end of the first set of windows 86 is 1.581 inches (4.016 cm) and the sleeve match diameter ID1 is 1.003 inches (2.548 cm). A ratio of the length L4 from the sleeve end with the flange 142 to a step 144 formed at the end of the first set of windows 86 to the sleeve match diameter ID1 is between 1.56 and 1.60.

In one example, the sleeve match diameter ID1 is 1.003 inches (2.548 cm) and the piston match diameter OD1 is 1.000 inches (2.540 cm). A ratio of the sleeve match diameter ID1 to the piston match diameter OD1 is between 0.99 and 1.01.

In one example, the overall length L1 of the sleeve 52 is 3.576 inches (9.083 cm) and the overall length L5 of the piston 42 is 3.648 inches (9.266 cm). A ratio of the overall length L1 of the sleeve 52 to the overall length L5 of the piston 42 is between 0.96 and 1.00.

In one example, the overall length L5 of the piston 42 is 3.648 inches (9.266 cm) and the piston match diameter OD1 is 1.000 inches (2.540 cm). A ratio of the overall length L5 of the piston 42 to the piston match diameter OD1 is between 3.58 and 3.71.

In one example, the length L6 of the recessed area 98 is 1.090 inches (2.769 cm) and the width W4 of the recessed area 98 is 0.455 inches (1.156 cm). A ratio of the length L6 of the recessed area 98 to the width W4 of the recessed area 98 is between 2.28 and 2.52.

In one example, the length L7 that extends from the end of the piston 42 with the flange 150 to the first edge of the recessed area 98 is 1.755 inches (4.450 cm) and the overall length L5 of the piston 42 is 3.648 inches (9.266 cm). A ratio of the length L7 that extends from the end of the piston 42 with the flange 150 to the first edge of the recessed area 98 to the overall length L5 of the piston 42 is between 0.46 and 0.50.

The recessed areas 98 also include a secondary recessed area 160 formed at one edge. The secondary recessed area 160 is defined by a length L8. In one example, the length L8 of the secondary recessed area 160 is 0.020 inches (0.051 cm) and the length L6 of the recessed area 98 is 1.090 inches (2.769 cm). A ratio of the length L8 of the secondary recessed area 160 in the piston 42 to the length L6 of the recessed area 98 in the piston 42 is between 0.01 and 0.05.

In one example, the piston's entry angle is 69 degrees and an exit angle is 65 degrees. A ratio of the entry angle to the exit angle is between 0.65 and 1.98.

In a method of replacing a sleeve 52 or piston 42 in a pressure regulating valve 38, at least one of the sleeve 52 or piston 42 is removed from the valve housing 50, and at least one of a replacement sleeve 52 or piston 42 replaces the removed sleeve 52 or piston 42. The sleeve 52 or piston 42 which is replaced is generally as disclosed above.

With a valve made according to the above description, the pressure setting shifts at different operating conditions are dramatically reduced and the operating is improved when compared to the prior art.

The pressure regulating valve 38 bypasses flow not needed by the engine while controlling the pressure setting across a metering valve. The pressure regulating valve has configured the sleeve 52 and piston 42 to meet valve pressure droop requirements. The combination of the piston outer diameter, neck diameter at the recessed areas, recessed area size, recessed area entry and exit angles, and the sleeve inlet and outlet windows cooperate to meet system requirements. The valve is designed to meet pressure droop requirements that are equivalent or tighter than previous valves with a four times reduction in pressure setting shift of the pressure regulating valve. The subject valve does not have negative droop, which is a significant improvement over prior art valves.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A sleeve for a valve comprising:
   a sleeve body surrounding a center axis and defined by an overall length extending from a first end to a second end, wherein the sleeve body has a central sleeve bore extending from the first end to the second end, the sleeve body including a first set of windows circumferentially spaced apart from each other about the central axis and a second set of windows axially spaced from the first set of windows and circumferentially spaced apart from each other about the central axis, and wherein each window of the first set of windows is defined by a first shape and each window of the second set of windows is defined by a second shape different than the first shape;

wherein one of the first and second sets of windows comprises an inlet in fluid communication with a metering valve and the other of the first and second sets of windows comprises an outlet in fluid communication with a pump;

wherein the central sleeve bore has a piston contact surface defined by a first inner diameter; and wherein the central sleeve bore is defined by a second inner diameter at one of the first and second sets of windows, and wherein the second inner diameter is greater than the first inner diameter.

2. The sleeve of claim 1 wherein one of the first and second sets of windows has a generally square shape with non-tapered end portion and the other of the first and second sets of windows has a generally square shape with a tapered end portion.

3. The sleeve of claim 1 wherein the sleeve includes a plurality of windows comprised only of the first and second sets of windows.

4. A sleeve and piston assembly for a valve comprising:

a sleeve surrounding a center axis and defined by an overall sleeve length extending from a first sleeve end to a second sleeve end, wherein the sleeve has a central sleeve bore extending from the first sleeve end to the second sleeve end, and wherein the sleeve includes a first set of windows and a second set of windows axially spaced from the first set of windows, and wherein one of the first and second sets of windows comprises a sleeve inlet in fluid communication a metering valve and the other of the first and second sets of windows comprises a sleeve outlet in fluid communication with a pump; and a piston received within the central sleeve bore and defined by an overall piston length extending from a first piston end to a second piston end, the piston having an outer surface comprising a sleeve contact surface that is defined by an outer diameter, and wherein the central bore has a first surface portion comprising a piston contact surface that is defined by a first inner diameter, wherein the piston contact surface is configured to slide against the sleeve contact surface, and wherein a ratio of the first inner diameter of the sleeve to the outer diameter of the piston is between 0.99 and 1.01, and wherein a ratio of the overall sleeve length to the overall piston length is between 0.96 and 1.00.

5. The sleeve and piston assembly according to claim 4 wherein the first set of windows extends circumferentially about the center axis, and wherein the central bore has a second surface portion at the first set of windows that is defined by a second inner diameter greater than the first inner diameter.

6. The sleeve and piston assembly of claim 4 wherein the sleeve includes a plurality of windows comprised only of the first and second sets of windows.

7. The sleeve and piston assembly of claim 4 wherein the sleeve inlet is in fluid communication with a metering valve outlet and wherein the sleeve outlet is in fluid communication with a pump inlet.

8. The sleeve and piston assembly of claim 4 wherein the piston includes a flange that is configured to abut against an end face of the sleeve.

9. The sleeve and piston assembly of claim 4 wherein one of the first and second sets of windows has a generally square shape with non-tapered end portion and the other of the first and second sets of windows has a generally square shape with a tapered end portion.

10. The sleeve and piston assembly of claim 4 wherein the sleeve includes a flange that comprises an abutment surface to contact an end face of an inwardly extending seat of a valve housing that seats the sleeve.

11. The sleeve and piston assembly of claim 10 wherein the flange is configured to be located within an internal bore of the valve housing.

12. The sleeve and piston assembly of claim 11 wherein the piston includes a flange that defines the outermost diameter of the piston and which is configured to abut against an end face of the sleeve, and wherein the flange of the sleeve defines the outermost diameter of the sleeve.

13. A pressure regulating valve comprising:

a valve housing defining an internal bore and having a valve inlet to receive fluid at a first pressure and a fluid outlet to return fluid to a pump;

a sleeve surrounding a center axis and defined by an overall sleeve length extending from a first sleeve end to a second sleeve end, wherein the sleeve has a central sleeve bore extending from the first sleeve end to the second sleeve end, and wherein the sleeve includes a first set of windows and a second set of windows axially spaced from the first set of windows, and wherein one of the first and second sets of windows comprises a sleeve inlet in fluid communication a metering valve and the other of the first and second sets of windows comprises a sleeve outlet in fluid communication with the pump;

a piston received within the central sleeve bore and defined by an overall piston length extending from a first piston end to a second piston end, the piston having an outer surface comprising a sleeve contact surface that is defined by an outer diameter, and wherein the central sleeve bore has a first surface portion comprising a piston contact surface that is defined by a first inner diameter, wherein the piston contact surface is configured to slide against the sleeve contact surface;

a spring assembly that biases the piston within the sleeve to a valve closed position, and wherein when the first pressure at the valve inlet is greater than a spring biasing load, the piston moves to a valve open position to return fluid to the pump via the valve outlet;

wherein a ratio of the first inner diameter of the sleeve to the outer diameter of the piston is between 0.99 and 1.01.

14. The pressure regulating valve of claim 13 wherein the sleeve includes a plurality of windows comprised only of the first and second sets of windows.

15. The pressure regulating valve of claim 13 wherein the sleeve inlet is in fluid communication with a metering valve outlet and wherein the sleeve outlet is in fluid communication with a pump inlet.

16. The pressure regulating valve of claim 13 wherein the piston includes a flange that is configured to abut against an end face of the sleeve.

17. The pressure regulating valve of claim 13 wherein the sleeve includes a flange that is configured to abut against an end face of an inwardly extending seat of the valve housing that seats the sleeve.

18. The pressure regulating valve of claim 13 wherein one of the first and second sets of windows has a generally square shape with non-tapered end portion and the other of the first and second sets of windows has a generally square shape with a tapered end portion.

19. The pressure regulating valve according to claim 13 wherein the first set of windows extends circumferentially about the center axis, and wherein the central sleeve bore has a second surface portion at the first set of windows that is defined by a second inner diameter greater than the first inner diameter.

20. The pressure regulating valve according to claim 19 wherein the windows of the second set of windows are circumferentially spaced apart from each other about the central axis, and wherein each window of the first set of windows is defined by a first shape and each window of the second set of windows is defined by a second shape different than the first shape, and wherein when in the valve open position, the piston is positioned to fluidly connect the first set of windows to the second set of windows.

21. The pressure regulating valve of claim 13 wherein the piston includes a flange that is configured to abut against an end face of the sleeve, and wherein the sleeve includes a flange that is configured to abut against an end face of an inwardly extending seat of the valve housing that seats the sleeve, and wherein the flange of the piston and the flange of the sleeve are configured to be located within the internal bore of the valve housing.

22. The pressure regulating valve of claim 21 wherein the flange of the piston defines the outermost diameter of the piston, and wherein the flange of the sleeve defines the outermost diameter of the sleeve.

23. A fuel supply system incorporating:
a fuel pump having a pump inlet and a pump outlet, the pump inlet being in fluid communication with a fuel supply;
a metering valve receiving fuel from the fuel pump and directing the fuel to a gas turbine engine; and
a pressure regulating valve configured to regulate the pressure across the metering valve and return excess fuel not utilized by the metering valve to the fuel pump, wherein the pressure regulating valve comprises
a valve housing defining an internal bore and having a valve inlet to receive fluid at a first pressure and a fluid outlet to return fluid to the fuel pump;
a sleeve surrounding a center axis and defined by an overall sleeve length extending from a first sleeve end to a second sleeve end, wherein the sleeve has a central sleeve bore extending from the first sleeve end to the second sleeve end, and wherein the sleeve includes a first set of windows and a second set of windows axially spaced from the first set of windows, and wherein one of the first and second sets of windows comprises a sleeve inlet in fluid communication a metering valve via the valve inlet and the other of the first and second sets of windows comprises a sleeve outlet in fluid communication with the fuel pump via the valve outlet;
a piston received within the central sleeve bore and defined by an overall piston length extending from a first piston end to a second piston end, the piston having an outer surface comprising a sleeve contact surface that is defined by an outer diameter, and wherein the central sleeve bore has a first surface portion comprising a piston contact surface that is defined by a first inner diameter, wherein the piston contact surface is configured to slide against the sleeve contact surface;
a spring assembly that biases the piston within the sleeve to a valve closed position, and wherein when the first pressure at the valve inlet is greater than a spring biasing load, the piston moves to a valve open position to return fluid to the pump via the valve outlet;
wherein a ratio of the first inner diameter of the sleeve to the outer diameter of the piston is between 0.99 and 1.01; and
wherein a ratio of the overall sleeve length to the overall piston length is between 0.96 and 1.00.

24. The fuel supply system of claim 23 wherein the sleeve includes a plurality of windows comprised only of the first and second sets of windows.

25. The fuel supply system of claim 23 wherein the sleeve inlet is in fluid communication with a metering valve outlet and wherein the sleeve outlet is in fluid communication with a pump inlet.

26. The fuel supply system of claim 23 wherein the piston includes a flange that is configured to abut against an end face of the sleeve.

27. The fuel supply system of claim 23 wherein the sleeve includes a flange that is configured to abut against an end face of an inwardly extending seat of the valve housing that seats the sleeve.

28. The fuel supply system of claim 23 wherein one of the first and second sets of windows has a generally square shape with non-tapered end portion and the other of the first and second sets of windows has a generally square shape with a tapered end portion.

29. The fuel supply system of claim 23 wherein the piston includes a flange that is configured to abut against an end face of the sleeve, and wherein the sleeve includes a flange that is configured to abut against an end face of an inwardly extending seat of the valve housing that seats the sleeve, and wherein the flange of the piston and the flange of the sleeve are configured to be located within the internal bore of the valve housing.

30. The fuel supply system of claim 29 wherein the flange of the piston defines the outermost diameter of the piston, and wherein the flange of the sleeve defines the outermost diameter of the sleeve.

31. A sleeve for a valve comprising:
a sleeve body surrounding a center axis and defined by an overall length extending from a first end to a second end, wherein the sleeve body has a central sleeve bore extending from the first end to the second end, the sleeve body including a first set of windows circumferentially spaced apart from each other about the central axis and a second set of windows axially spaced from the first set of windows and circumferentially spaced apart from each other about the central axis, and wherein each window of the first set of windows is defined by a first shape and each window of the second set of windows is defined by a second shape different than the first shape;
wherein the central sleeve bore has a piston contact surface defined by a first inner diameter;
wherein the central sleeve bore is defined by a second inner diameter at one of the first and second sets of windows, and wherein the second inner diameter is greater than the first inner diameter: and
wherein the sleeve includes a flange that comprises an abutment surface to contact an end face of an inwardly extending seat of a valve housing that seats the sleeve, and wherein the flange comprises the outermost diameter of the sleeve.

* * * * *